INVENTORS
RICHARD OLSHAUSEN
CHARLES L. LUTES
BY
*A. M. Fernandez*
ATTORNEY

United States Patent Office 3,281,827
Patented Oct. 25, 1966

3,281,827
ANALOG-TO-DIGITAL CONVERTER
Richard Olshausen, Sunset Beach, and Charles L. Lutes, Anaheim, Calif., assignors to North American Aviation, Inc.
Filed June 27, 1963, Ser. No. 291,021
8 Claims. (Cl. 340—347)

This invention pertains to analog-to-digital converters, and more particularly to apparatus for directly converting a voltage signal to a whole value number in digital form.

In digital control systems which employ measurement of control parameters, an analog-to-digital conversion is required because of the inherent analog nature of the measured phenomena. In instrumentation, analog sensing elements have been employed in conjunction with analog-to-digital converters of the type which require accurately calibrated voltage sources in order to achieve accurate analog-to-digital conversion. Such analog-to-digital converters are often more complex than equivalent analog systems. In some cases the converters actually approach or even exceed the cost of the computer that is to use the data, and in some applications the digital output is not suitable for direct use due to the characteristics of the analog-to-digital converter. Thus if a minimal amount of analog-to-digital converting equipment is required, a direct conversion of a voltage signal to a whole value number in suitable digital form is desirable.

An object of this invention is to minimize the equipment necessary for analog-to-digital conversion.

Another object of the invention is to provide an analog-to-digital converting system which will directly convert the analog voltage output of a sensor to a number in digital form without requiring the intermediate conversion of a number to an analog voltage.

In a copending application Serial No. 149,046, filed October 31, 1961, now Patent No. 3,204,466, and assigned to the assignee of the present application, a system is disclosed in which a basic sensor, such as an accelerometer, is an integral part of the converter and the digital output is the integral of the input. If the sensor is an accelerometer, angular acceleration is the measured quantity and angular rate is the digital output.

The sensor of that system is of the force-rebalance type consisting of a rotor free to rotate within its case so that angular accelerations of the case result in a displacement of the rotor proportional to the integral of acceleration. A sensitive pick-off measures the displacement and provides a bipolar signal that is amplified to set a logic network to a plus, zero or minus state depending upon the position of the rotor. The plus or minus state of the logic network determines the sign or polarity of a torquing signal applied to the rotor through the torque coil. In that manner, the rotor is restored to its zero reference position with respect to the case. The average value of the plus and minus torquing signals is proportional to angular acceleration.

The torquing signals are accumulated in a register in synchronism with the changing of the plus and minus levels of the torquing signals. The torquing signals are always of the same magnitude so that the sum of the accumulated signals over a specified period of time is proportional to angular rate.

In such a system it is possible to replace the angular accelerometer with an integrating rate gyro which incorporates means for electromagnetically torquing the output gimbal. The movement of the output gimbal is analogous to the movement of the rotor in the angular accelerometer so that the digital output is angular displacement. In a similar manner any force-rebalanced type of sensor could be substituted for the angular accelerometer. By digitally differentiating the output from the accumulator, a non-integrated quantity can be obtained. However, if the counting rate of the accumulator is not sufficiently high or if the sampling period for digital differentiation is too short, a loss of resolution will result.

Accordingly, another object of the invention is to provide an analog-to-digital converting system to obtain the non-integrated value of the sensor voltage output.

These and other objects of the invention are achieved by placing an integrator in the feedback loop, thereby obtaining the non-integrated value of the sensor output. Since drift-free operational amplifiers for integration require complex and precise electronic circuits, a simple integrating circuit is employed in a preferred embodiment in place of the operational amplifier and the digital output is operated on by a computer which introduces a simple compensation for the imperfection of the simple integrating circuit.

Other objects of the invention will become apparent from the following description with reference to the drawings in which.

Figure 1:
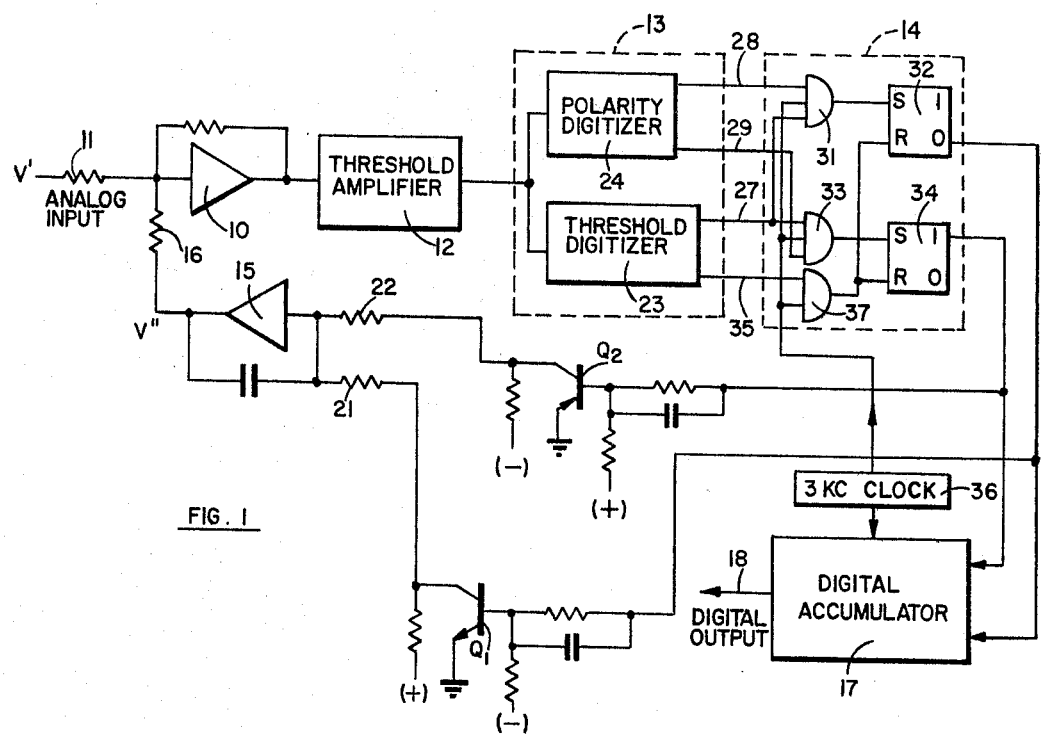
FIG. 1 is a schematic diagram of one embodiment of the invention.

Referring to FIG. 1, there is provided a summing amplifier 10 adapted to receive an analog input signal through a summing resistor 11. The summing amplifier may be any high-gain operational amplifier or equivalent current summing device.

The output of the summing amplifier 10 is coupled to a threshold amplifier 12 which provides output signals above pre-selected thresholds or levels of either polarity.

The bipolar output of the threshold amplifier 12 is coupled to a digitizer 13 for providing discrete signals indicative of the sense and value of the signal translated from the summing amplifier 10 through the threshold amplifier 12. The discrete signals from the digitizer 13 are coupled to a logic network 14 to provide discrete signals indicative of combinations of value and sense of the signal translated by the threshold amplifier 12 to the digitizer 13.

A logic network 14 in the illustrated embodiment of FIG. 1 transmits discrete signals to control transistors $Q_1$ and $Q_2$ which function as current shunting switches. The switches in turn control the transmission of positive and negative current signals respectively to an integrator 15, the output of which is transmitted to the summing amplifier 10 through a summing resistor 16 to drive the error signal to the threshold amplifier 12 toward zero volts.

The discrete signals which control the current switches $Q_1$ and $Q_2$ are also transmitted to a digital accumulator 17. The digital accumulator responds to the discrete signals to respectively add and subtract pulses to a digital number stored therein at, for example, a 3 kc. rate. In the simple illustrative embodiment of FIG. 1, the pulses to be added or subtracted are weighed to have a binary value of 1, but any other weighted value may be used. In that manner the digital accumulator provides at its output 18 a digital number representative of the analog input signal.

In operation, an analog signal V' is compared to the output V" of the analog integrator 15. The polarity of the error signal transmitted by the summing amplifier 10 determines the sign of the discrete output of the logic network 14. That discrete output is fed to the analog integrator such that the output of the integrator is driven more nearly equal in amplitude to the analog input signal, but of the opposite sense, thereby maintaining a minimum error signal from the summing amplifier 10.

The digital accumulator samples the signals going to the analog integrator 15 and adds or subtracts a number according to the sign of the error signal transmitted by the summing amplifier 10. Thus the number in the digital accumulator 17 is proportional to the signal V" which is maintained equal to the input V' by the control signals from the logic network 14.

It should be understood that the foregoing embodiment and operation of the invention is by way of example and that other embodiments will be apparent to those skilled in the art. For simplicity, a three-level logic network 14 has been illustrated; by that it is meant that the logic network 14 responds to signals from the digitizer 13 to provide three signal conditions, plus, minus and zero. A zero is generated implicitly by the concurrent absences of the plus and minus signals. Other logic networks, such as a two-level (plus, minus) or a five-level (+2, +1, 0, −1, −2) logic network may be employed.

The add and subtract signals operate the current switches $Q_1$ and $Q_2$ to provide current signals to the integrating amplifier over resistors 21 and 22 which are inversely proportional to the digital numbers added to the number stored in the accumulator. Accordingly, since the digital number is a binary 1, the resistors each provide one unit of current. If the digital number had been selected to be a binary 2, the resistors would each have been selected to provide two units of current.

The digitizer 13 comprises a threshold level digitizer 23 and a polarity digitizer 24. Both are responsively connected to the output of the threshold amplifier 12 for providing on a line 27 a first two-state signal indicative of the presence of an output signal from the amplifier 12, and for providing on line 28 a second two-state signal indicative of the presence of an output signal of one sense from the amplifier 12 and on line 29 a third two-state signal indicative of the presence of an output signal of the opposite sense from the amplifier 12. For a positive input signal from amplifier 12, line 28 is positive, line 29 is negative and line 27 is positive thereby enabling an AND gate 31 to set a flip-flop 32 which, upon being set, provides a negative output signal from its "false" or "0" output terminal. When the input signal from the amplifier 12 to the digitizer 13 is negative, line 28 is negative and line 29 is positive thereby enabling an AND gate 33 to set a flip-flop 34 which, upon being set, provides a positive output signal from its "true" or "1" output terminal.

The transistor current switches $Q_1$ and $Q_2$ are both biased to be normally conducting at saturation while the flip-flops 32 and 34 are reset, thereby effectively clamping input terminals of resistors 21 and 22 to ground. The transistor $Q_1$ is of the NPN type so that it is cut off by a negative signal from the flip-flop 32 while it is set to provide a positive signal to the integrating amplifier 15 through the resistor 21. That signal is integrated and transmitted through the summing resistor 16 to decrease the positive error signal from the summing amplifier 10 in response to which the threshold digitizer 23 reverses its state to provide a negative signal on the line 27 and a positive signal over a line 35 to reset the flip-flop 32. When the flip-flop 32 is reset, the transistor $Q_1$ again conducts at saturation. If the analog input should then further increase by a predetermined amount established by the threshold amplifier 12, the threshold and polarity digitizers are again operated to enable the AND gate 31 and set the flip-flop 32 in response to which another number is added to a number stored in the digital accumulator 17.

If the analog input signal should decrease, the threshold amplifier 12 would transmit a negative signal from the summing amplifier 10 to the digitizer 13 which would then operate the threshold and polarity digitizers 23 and 24 to enable the AND gate 33 and set the flip-flop 34, thereby providing a positive output signal which cuts off the PNP transistor $Q_2$. While the transistor $Q_2$ is cut off, a negative signal is transmitted to the integrating amplifier 15 through the resistor 22 to decrease the amplitude of the integrated signal transmitted to the summing amplifier 10 through the resistor 16. When the error signal from the amplifier 10 is reduced to zero, or below the predetermined level established by the threshold amplifier 12, the threshold and polarity digitizers 23 and 24 are operated to disable the AND gate 33 and reset the flip-flop 34.

In a preferred embodiment, the digital accumulator is synchronized by a timing signal source 36 which provides a sampling rate of 3 kc. for a maximum period between samples of approximately .00033 second. The manner in which the digital accumulator may be implemented is also disclosed by the aforesaid copending patent application. The 3 kc. pulses are also applied to the AND gates 31 and 33 to synchronize the feedback to the summing amplifier with the sampling in the accumulator 17. An AND gate 37 is provided to also synchronize the resetting of the flip-flops 32 and 34.

Figure 2:
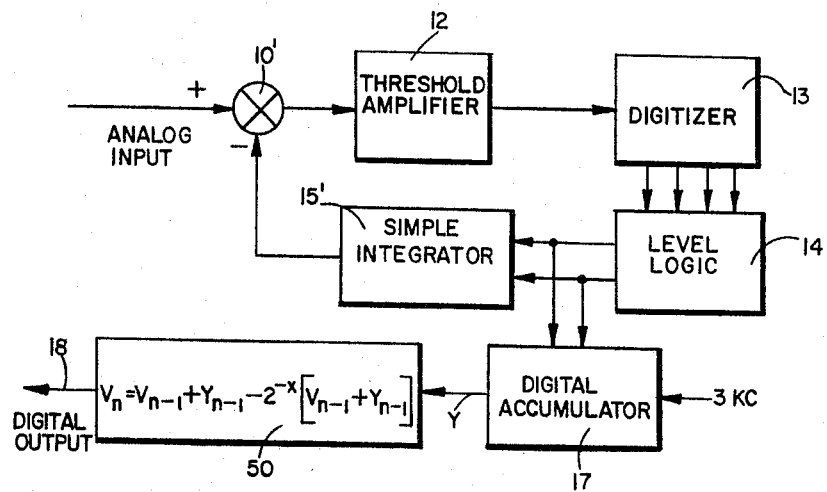
FIG. 2 is a schematic diagram of a second embodiment of the invention.

In many applications, the analog integrator 15 of the embodiment illustrated in FIG. 1 may be impractical. For those applications, the analog integrator 15 may be replaced by a simple integrator 15' having a transfer function equal to $K/S+A$ particularly when the digital accumulating operation is coupled with a computing operation which, in accordance with the present invention, will compensate for the imperfect integrating characteristics of the simple integrator. Such a modified system is illustrated in FIG. 2. Except for the addition of a computer 50 for the computing operation, the modified system is the same as the system of FIG. 1 and embodies all of the principles of the invention discussed with reference thereto.

The computer 50 provided for the purpose of computing the compensation desired in the system of FIG. 2 may be a stored program, digital computer which may include the accumulator 17. In the aforesaid copending application, the accumulator is implemented on a magnetic disc memory channel which is but one of many channels in a digital computer.

The computing process which may be effected by a recurring routine of a stored program is in accordance with the following equation:

$$V_n = V_{n-1} + Y_{n-1} - G[V_{n-1} + Y_{n-1}]$$

where $V_{n-1}$ is the last compensated digital number computed;
$Y_{n-1}$ is the last uncompensated digital number received from the accumulator; and
G is a constant gain factor selected to be a power of the binary number 2, such as $2^{-x}$, to simplify the step of multiplying in the computer to a mere shifting operation. It should be noted that although signals are algebraically added in the accumulator at a clock rate of about 3 kc., the compensation computing process recurs at a much slower rate of about 33.3 computations per second since the computations cannot be feasibly accomplished at the clock rate of the accumulator if the accumulator is implemented in the computer, particularly if other computations required for other purposes must be performed by the computer on a time sharing basis.

By holding the constants K and A to a certain relationship with the constant gain factor $2^{-x}$ and the sampling period T, the digital output $V_n$ of the computer is made proportional to the analog input V, which may represent any sensed parameter. The desired relationship for the constants K, A, $2^{-x}$ and T are determined by equating the Z transforms of the digital computer in combination with the accumulator and the analog loop which includes the integrator 15'. The following equations show this result:

$$G + e^{-AT} = 1 \qquad (2)$$

$$K = \frac{(AT)^2 e^{-AT}}{2(AT - 1 + e^{-AT})} \qquad (3)$$

$$\frac{1 - e^{AT}(1 + AT)}{AT - 1 + e^{-AT}} = 1 \qquad (4)$$

The digital accumulator 17 may also include or comprise an actuator, reaction control jet, or any device which responds to positive and negative signals for actuation of some load, in which case the position of the load at any given time is representative of the value of the analog input signal. The average value of the pulses applied directly to such an actuator from the logic network 14 is approximately equal to $$V' \frac{K'(S+A)}{S+A+KK'}$$

where V' is the analog input signal, K' is some function of V' and KK' is normally greater than A.

While the principles of the invention have now been made clear in an illustrative embodiment, obvious modifications particularly adapted for specific environments and operating requirements may be made without departing from those principles. The appended claims are therefore intended to embrace any such modifications.

What is claimed is:

1. In cooperation with a digital accumulator for providing a digital output indicative of an analog signal input, the combination comprising
    a signal summing means adapted to receive an analog signal,
    detection means responsive to an output signal of said summing means for providing discrete signals representative of the sense and value of said output signal, and
    an electronic integrating network responsive to said discrete signals and having a predetermined transfer function for coupling an analog feedback signal to said summing means to drive said output signal toward zero amplitude, said digital accumulator being responsive to said discrete signals.

2. In cooperation with a digital accumulator for providing a digital output indicative of an analog signal input, the combination comprising
    a signal summing means adapted to receive an analog signal,
    detection means responsive to an output signal of said summing means for providing discrete signals representative of the sense and value of said output signal, and
    analog integrating means having a transfer function of the form $K/S+A$ responsive to said discrete signals for providing an analog feedback signal to said summing means to drive said output signal toward zero amplitude, said digital accumulator being responsive to said discrete signals.

3. In cooperation with a digital accumulator for providing a digital output indicative of an analog signal input, the combination comprising
    a signal summing means adapted to receive an analog signal,
    detection means responsive to an output signal of said summing means for providing discrete signals representative of the sense and value of said output signal, and
    analog integrating means responsive to said discrete signals for providing an integrated analog feedback signal to said summing means to drive said output signal toward zero amplitude, said digital accumulator being responsive to said discrete signals.

4. An analog-to-digital converter comprising
    a signal summing means adapted to receive an analog signal,
    detection means responsive to an output signal of said summing means for providing discrete signals representative of the sense and value of said output signal,
    analog integrating means responsive to said discrete signals for providing an integrated analog feedback signal to said summing means to drive said output signal toward zero amplitude, and
    accumulating means responsive to said discrete signals from said detection means for algebraically adding to a digital number stored therein said discrete signals representing the value of said output signal in accordance with said discrete sense signals, whereby a digital number representative of said analog signal is derived.

5. An analog-to-digital converter as defined by claim 4 wherein said integrating means is an analog integrator which includes a high gain feedback amplifier for nearly perfect integration.

6. An analog-to-digital converter as defined by claim 4 wherein said integrating means is a simple integrating network having a transfer function $K/S+A$.

7. An analog-to-digital converter as defined by claim 6 in combination with computing means adapted to periodically receive said digital number and compute another number more nearly equal to the value of said analog input signal, thereby compensating for imperfect integration by said simple integrating network.

8. An analog-to-digital converter as defined by claim 7 wherein the computation for compensating for imperfect integration is in accordance with the equation $$V_n = V_{n-1} + Y_{n-1} - G[V_{n-1} + Y_{n-1}]$$

where $V_{n-1}$ is the last compensated number computed, $Y_{n-1}$ is the last uncompensated number accumulated by said accumulating means and G is a predetermined constant.

References Cited by the Examiner

UNITED STATES PATENTS

| | | | |
|---|---|---|---|
| 3,015,815 | 1/1962 | Mann | 340—347 |
| 3,049,701 | 8/1962 | Amdahl | 340—347 |
| 3,204,466 | 9/1965 | Henderson | 73—503 |

MAYNARD R. WILBUR, *Primary Examiner.*

DARYL W. COOK, ROBERT C. BAILEY, *Examiners.*

A. L. NEWMAN, *Assistant Examiner.*